United States Patent
Xue et al.

(10) Patent No.: US 9,537,530 B1
(45) Date of Patent: Jan. 3, 2017

(54) TRANSCEIVER DEVICE AND METHOD OF PROCESSING SIGNALS

(71) Applicant: Intel Corporation, Santa Clara, CA (US)

(72) Inventors: Feng Xue, Redwood City, CA (US);
Yang-Seok Choi, Portland, OR (US);
Shu-Ping Yeh, New Taipei (TW);
Shilpa Talwar, Los Altos, CA (US);
Roya Doostnejad, Los Altos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/751,181

(22) Filed: Jun. 26, 2015

(51) Int. Cl.
*H04B 1/44* (2006.01)
*H04B 15/00* (2006.01)
*H04B 17/391* (2015.01)

(52) U.S. Cl.
CPC ............. *H04B 1/44* (2013.01); *H04B 17/391* (2015.01)

(58) Field of Classification Search
CPC .................................. H04B 1/44; H04B 1/391
See application file for complete search history.

(56) References Cited

U.S. PATENT DOCUMENTS

| 2008/0095279 A1 | 4/2008 | Reial et al. |
| 2013/0044791 A1 | 2/2013 | Rimini et al. |
| 2015/0171902 A1 | 6/2015 | Fleischer et al. |

OTHER PUBLICATIONS

Dimitri P.Bertsekas, "Nonlinear programming, second edition", Massachusetts Institute of Technology, 1995.
Extended European search report received for corresponding EP Patent Application No. 16171842.4 dated Oct. 25, 2016, 8 pages.

*Primary Examiner* — Ping Hsieh
*Assistant Examiner* — Xin Jia

(57) ABSTRACT

A method of processing signals may include calculating a covariance matrix and a correlation vector based on an input signal vector and an output signal vector; identifying a plurality of critical elements of a parameter vector based on a predefined criteria, wherein the parameter vector describes a relationship between the input signal vector and the output signal vector; calculating a solution to a linear system to generate a reduced parameter update vector having a plurality of elements, wherein the linear system is based on the plurality of critical elements of the parameter vector, the covariance matrix, and the correlation vector; updating the plurality of critical elements of the parameter vector using the reduced parameter update vector to generate an updated parameter vector, wherein the reduced parameter update vector has less elements than the parameter vector; and processing one or more signals associated with the input signal vector using the updated parameter vector.

20 Claims, 4 Drawing Sheets

TRANSCEIVER DEVICE AND METHOD OF PROCESSING SIGNALS

TECHNICAL FIELD

Various embodiments relate generally to a transceiver device and a method of processing signals.

BACKGROUND

Many conventional wireless devices perform both wireless transmission and reception and therefore contain both transmitter and receiver components (i.e. transceivers). Transceiver designs may include such transmitter and receiver components arranged in close proximity another, and there often may exist a level of indirect or shared coupling between the components. As a result, many transceiver designs may be susceptible to leakage between the transmitter and receiver chains.

Leakage may be especially prevalent in single or shared antenna systems, where the transmitter and receiver chains may both be coupled to duplexing circuitry. Accordingly, leakage from the transmitter chain to the receiver chain may result in self-interference, where a signal intended for transmission is imposed onto a received signal.

As the transmitted signal is known at the transceiver, it may be possible to model the path between the transmitter and receiver chains in order to cancel out the leakage signal from the signal at the receiver.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
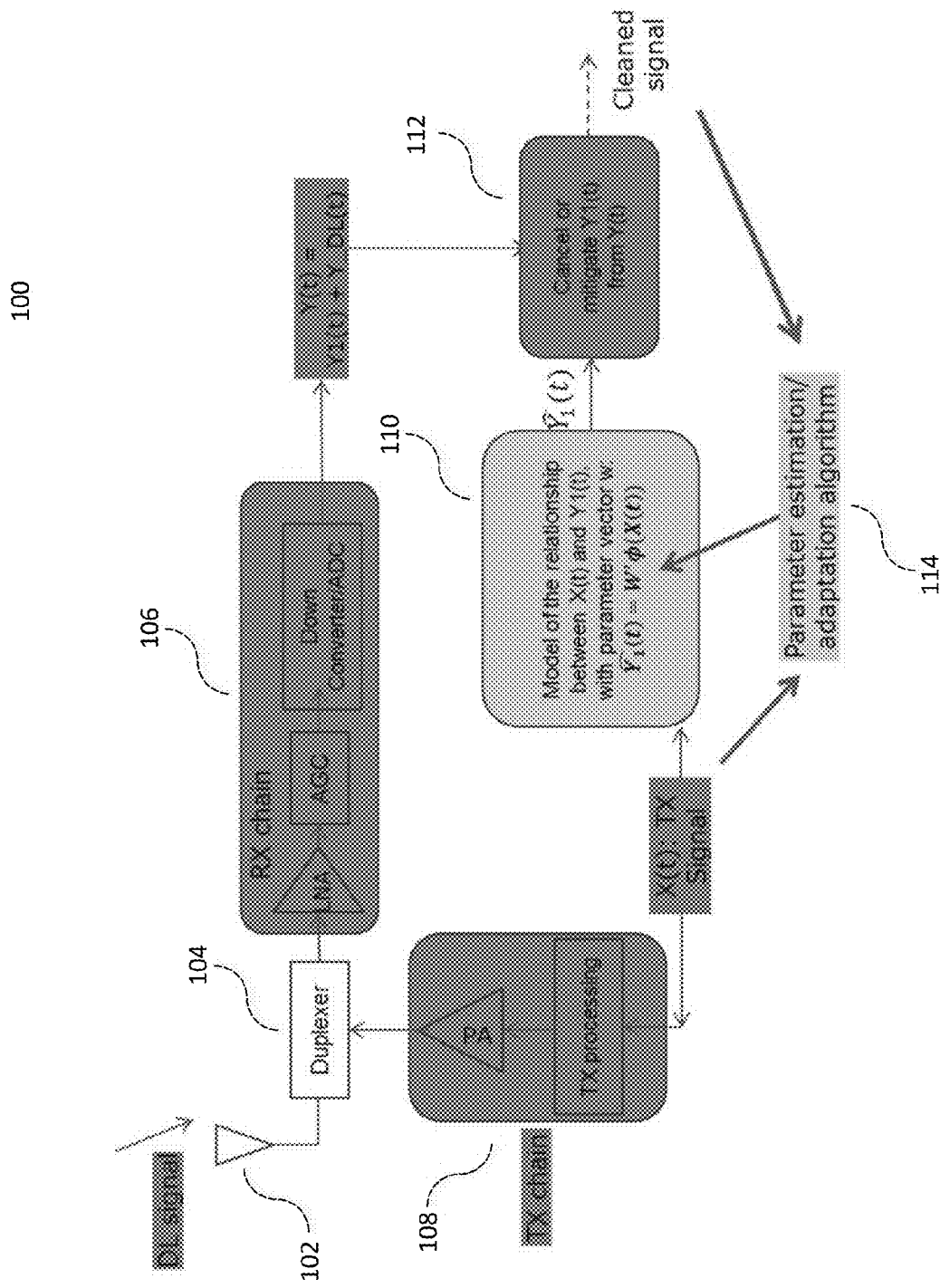
FIG. 1 shows a block diagram corresponding to a mobile device.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc.

Furthermore, it is appreciated that references to a "vector" may refer to a vector of any size or orientation, i.e. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, i.e. including a 1×1 matrix (e.g. a scalar), a 1×M matrix (e.g. a row vector), and an M×1 matrix (e.g. a column vector).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

The term "base station" used in reference to an access point of a mobile communication network may be understood as a macro base station, micro base station, Node B, evolved NodeBs (eNB), Home eNodeB, Remote Radio Head (RRHs), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel.

FIG. 1 shows a block diagram illustrating the internal components of a mobile device 100. Mobile device 100 may be e.g. a mobile terminal device configured to perform wireless communications over a radio access network. For example, mobile device 100 may be configured to operate according to a $3^{rd}$ Generation Partnership Project (3GPP)

wireless network, such as e.g. a Global System for Mobile Communications (GSM) network, Universal Mobile Telecommunications System (UMTS) network, or Long Term Evolution (LTE) network. Mobile device 100 may be further configured to operate according to a number of other radio access technologies, and it is thus appreciated that the disclosure detailed herein may be applied to any number of different radio access technologies.

Mobile device 100 may include antenna 102, duplexer 104, receiver (RX) chain 106, transmitter (TX) chain 108, modeling logic 110, cancelation logic 112, and parameter estimation logic 114. As shown in FIG. 1, antenna 102 may be shared between RX chain 106 and TX chain 108 in order to perform both wireless reception and transmission. Although antenna 102 is illustrated as a single antenna, it is appreciated that antenna 102 may be similarly implemented as an antenna array including a plurality of antennas.

The aforementioned components and logic circuitry of mobile device 100 may be implemented as separate hardware components or separate circuits, e.g. as separate integrated circuits, as illustrated in FIG. 1. However, it is understood that some or all of the circuits may be implemented by a common programmable processor, such as e.g. a microprocessor. Accordingly, some or all of the functionality of the one or more of the aforementioned components may be consolidated into a single hardware component. It is also understood that mobile device 100 may include a number of additional components, including hardware, processors, memory, and other specialty or generic hardware/processors/circuits, etc., in order to support a variety of additional operations of wireless radio communications. Mobile device 100 may additionally include core hardware, such as one or more processors dedicated to performing and/or support mobile communication applications. Mobile device 100 may also include a variety of user input/output devices such as displays, keypads, touchscreens, speakers, external buttons, etc.

Duplexer 104 may be utilized in order to facilitate both wireless reception by RX chain 106 and wireless transmission by TX chain 108 using antenna 102. For example, antenna 102 may wirelessly receive one or more downlink signals and provide resulting a resulting downlink signal to duplexer 104. Duplexer 104 may provide the downlink signal to RX chain 106. RX chain 106 may process the downlink signal, such as with a low noise amplifier (LNA), automatic gain controller (AGC), and down converter/analog-to-digital converter (ADC), and may output resulting signal y(t).

TX chain 108 may provide an uplink signal to duplexer 104, which may then provide the uplink signal to antenna 102 for wireless transmission. For example, TX chain may receive signal X(t) intended for uplink transmission and perform transmission processing and amplification thereon, such as with processing circuitry and a power amplifier. TX chain 108 may then provide the resulting signal to duplexer 104 for subsequent wireless transmission by antenna 102. It is appreciated that X(t) may be e.g. a singular value or a grouping of a plurality of singular values, such as e.g. a transmission symbol representing a plurality of binary bits.

Accordingly, both RX chain 106 and TX chain 108 may share a common connection to duplexer 104 in order to receive downlink signals and transmit uplink signals, respectively. Due to imperfect isolation, the uplink signal provided by TX chain 108 may leak into RX chain 106, thereby potentially corrupting the received signal produced by RX chain 106. As shown in FIG. 1, RX chain 106 may output signal y(t), where y(t)=$y_1(t)$+$y_{DL}(t)$, $y_1(t)$ is the leakage signal corresponding to X(t), and $y_{DL}(t)$ is the received downlink signal corresponding to the desired downlink signal receiver by antenna 102. It is appreciated that additional leakage paths between TX chain 108 and RX chain 106 may exist.

y(t) as output by RX chain 106 may therefore contain two distinct components in $y_{DL}(t)$ and $y_1(t)$, where $y_{DL}(t)$ corresponds to the received downlink signal containing desired information and $y_1(t)$ corresponding to signal X(t) leaking from TX chain 108. y(t) may thus be corrupted by the presence of $y_1(t)$.

The presence of leakage $y_1(t)$, also known as "self-interference", may cause significant performance degradation at the receiver side. It is appreciated that leakage such as $y_1(t)$ may be capable of causing such self-interference even in frequency duplexing systems that utilize separate transmission and reception frequency bands or time duplexing systems that transmit and receive during separate time periods. The underlying self-interference problem is similarly not solved by the use of dedicated (i.e. non-shared) antennas, as leakage may still occur through a variety of indirect coupling paths between the RX and TX chain.

Self-interference caused by TX chain leakage may be addressed by estimating the leakage at the signal produced by the RX chain (i.e. $y_1(t)$ in y(t)) and canceling the estimated leakage. As the leakage source signal X(t) is known at mobile device 100, it may thus be possible to model the path from TX chain 108 to RX chain 106 in order to estimate $y_1(t)$ from x(t), thereby obtaining leakage estimate $\hat{y}_1(t)$. A parameterized linear model may be used to model the relationship between X(t) and $y_1(t)$. Based on the output of the model, the leakage signal $y_1(t)$ may be canceled out of the RX chain signal y(t) through the use of leakage estimate $\hat{y}_1(t)$.

As shown in FIG. 1, TX chain input signal X(t) may be provided to modeling logic 110. Modeling logic 110 may output leakage estimate $\hat{y}_1(t)$ to cancelation logic 112, which may then cancel out leakage from RX chain input signal y(t) based on the provided leakage estimate $\hat{y}_1(t)$. Modeling logic 110 may determine leakage estimate $\hat{y}_1(t)$ by utilizing a parameter vector W to model the relationship between input signal X(t) and leakage signal $y_1(t)$. Parameter estimation logic 114 may continuously update the model parameters of parameter vector W of modeling logic 110 in order to provide accurate model characterization in real-time, thereby enabling mobile device 100 to obtain an accurate estimate $\hat{y}_1(t)$ of leakage signal $y_1(t)$.

Modeling logic 110 may model the relationship between X(t) and $y_1(t)$ to produce leakage estimate $\hat{y}_1(t)$ using parameter vector W as follows:

$$\hat{y}_1(t)=W'\phi(X(t)) \qquad (1),$$

where W' is the transpose of W and $\phi(X(t))$ is a function of the current and past input samples contained in RX chain input signal vector X(t)={X(t), X(t−1), ... X(t−$T_0$)} with $T_0$ being the memory length of the model. As previously detailed, X(t) may represent a singular value or may be a grouping of a plurality of singular values, such as a transmission symbol.

The function $\phi$ may be a "kernelization" or "mapping" function, and may be utilized in order to compensate for the non-linear relationship between $y_1(t)$ and TX chain input signals X(t). This non-linearity may be introduced into the leakage path from TX chain 108 to RX chain 106 due to any of a number of sources, such as differing transmission and reception frequency bands, non-linear components such as power amplifiers, and a number of additional components such as filters and delays. As a result, leakage signal $y_1(t)$ may be a non-linear function of current and past TX chain input signals $X(t):=(X(t), X(t-1), \ldots, X(t-T_0))$.

Kernelization function $\phi(X(t))$ may thus be used to translate original (i.e. unmapped) input signals $X(t)$, $X(t-1), \ldots, X(t-T_0)$ into the linear space corresponding to leakage signal $y_1(t)$. A parameterized linear model based on the estimation of parameter vector W may then be utilized in order to estimate leakage estimate $\hat{y}_1(t)$ from $X(t)$ based on Equation 1.

Accordingly, a solution to the self-interference cancelation problem may be provided through linear parameter estimation of the parameter vector W. Maintenance of a parameter vector W that accurately characterizes the relationship between TX chain input signals $X(t)$ and leakage signal $y_1(t)$, thereby providing an effective means of estimating leakage estimate $\hat{y}_1(t)$. As the relationship between $X(t)$ and $y_1(t)$ is complex, parameter vector W may contain hundreds of parameters. W must be constantly updated based on observations of TX chain input signals $X(t)$ and RX chain input signals $Y(t)$ in order to maintain a sufficiently comprehensive model.

Classical methods such as linear mean square (LMS) and recursive linear square (RLS) may be utilized in order to estimate parameter vector W following translation of $X(t)$ into the linear domain of $y_1(t)$ with kernelization function $\phi(X(t))$. However, these classical methods may suffer from a variety of concerns relate to convergence speed, complexity, and power consumption requirements of these classical methods. LMS offers a simple implementation (i.e. relatively low complexity) but suffers from slow convergence speeds. In contrast, RLS provides fast convergence speeds but proves too complex for many real-time implementations.

Several simplifications have been offered for RLS approaches in order to reduce complexity to practical levels. However, these simplifications face several drawbacks in dynamic scenarios such as the proposed scenario of self-interference cancelation. Methods offering large reductions in complexity often prove to be too simple to avoid spikes in the estimation and/or cancelation, while more comprehensive methods suffer from over-complication and require precise offline parameter setting.

For example, coordinate descent (CD) offers a drastic reduction in complexity over the aforementioned classical methods. As opposed to updating every parameter in W, CD algorithms update only a single parameter. While this approach provides a predictable decrease in complexity, convergence speed may be unacceptably slow.

Another proposed simplification to the classical approaches is conjugate gradient (CG), where each parameter update to W is based on a quadratic cost function and descends along an optimal direction with optimal step-size determined based on the assumption of a linear system. Due to the optimized update directionality, CG may offer fast convergence in a variety of implementations. However, in many cases the overall complexity will be similar to RLS.

Accordingly, reception of wireless signals by mobile device 100 may be improved through the implementation of a parameter update scheme for parameter vector W for use in estimating leakage signal $y_1(t)$ that offers high accuracy, relatively fast convergence speed, and reduced complexity.

Updates of W may be necessary given each new observation of TX chain input signals $X(t)$ and RX chain input signals $Y(t)$. As previously detailed, the relationship modeling the estimated leakage $\hat{y}_1(t)$ from TX chain input signal $X(t)$ may be denoted as $\hat{y}_1(t)=W'\phi(X(t))$ (see Equation 1), where $\phi(X(t))$ is an N×1 vector mapping current and past TX chain input signals $X(t):=(X(t), X(t-1), \ldots, X(t-T_0))$ to the linear domain of $\hat{y}_1(t)$. Each element of $\phi$ may be a non-linear function of one or more past TX chain input signals of $X(t)$. Each new observation of $X(t)$ (i.e. each subsequent transmitted TX chain input signal) may therefore require an update of vector $\phi(X(t))$, as one or more elements of $\phi(X(t))$ may depend on the most recently transmitted TX chain signal $X(t)$.

For clarity, $u(t)$ may be used to denote $\phi(X(t))$. At a given time t, Equation 1 may be expressed as follows:

$$u(t)'W=y_1(t)$$

$$u(t-1)'W=y_1(t-1)$$

$$\ldots$$

$$u(1)'W=y_1(1)$$

This may be written into compact form using the matrices $U(t)$ and $Y_1(t)$ as follows:

$$U(t)'W=Y_1(t) \qquad (2),$$

where $U(t):=(u(t), \ldots, u(1))$ and $Y_1(t):=(y_1(t), \ldots, y_1(t))'$.

The parameter vector W that achieves the minimum mean square error (MMSE) is typically the optimal solution. It may be shown that the vector W achieving the MMSE is additionally the solution to Equation (3) as follows:

$$U(t)U(t)'W=U(t)Y_1(t) \qquad (3).$$

$R(t)$ may then be defined as $R(t):=U(t)U(t)'=u(t)u(t)'+u(t-1)u(t-1)'+\ldots+u(1)u(1)'$, which is the empirical covariance matrix of the kernelized input signal vectors ($\phi(X(k))$, $k=1, 2, \ldots t$) where vector $X(k)=(X(k),X(k-1), \ldots, X(k-T_0))$. Similarly, $\beta(t)$ may be defined as $\beta(t)=U(t)Y_1(t)$, which is the correlation between the kernelized input signal vectors $\phi(X(k))$ and the observation vector $Y_1$.

Equation (3) may then be rewritten using $R(t)$ and —(t):

$$R(t)W=\beta(t) \qquad (4).$$

Accordingly, Equation (4) may be solved for W in order to obtain a parameter vector W that accurately models the relationship between $\phi(X(t))$ and $y_1(t)$, thereby providing a model to estimate the leakage $\hat{y}_1(t)$ in order to effectively cancel the leakage from RX chain input signal $y(t)$. W may consequently used in the estimation and cancelation of leakage in future transmissions.

A potential solution for W in Equation (4) may be realized by computing the inverse of $R(t)$. However, $R(t)$ have dimensions greater than 100×100, which consequently presents an increasingly complex inversion operation. The aforementioned parameter estimation approaches such as LMS, RLS, CD, and CG have thus been offered as alternatives providing reduced complexity.

For example, CG may be utilized in order to compute W satisfying Equation (4) that involves updating each element of W based on a quadratic cost function and optimal step-size. However, this approach may be overly complex as W will often have dimensions greater than 100×1, and accordingly will require an equivalent number of updates in order to complete CG estimation thereof.

CD, as previously detailed, involves only the update of a single element of W. However, the drastic reduction in complexity may lead to increased susceptibility to spikes in the estimation and/or cancelation of leakage once the solution is applied.

Figure 2:
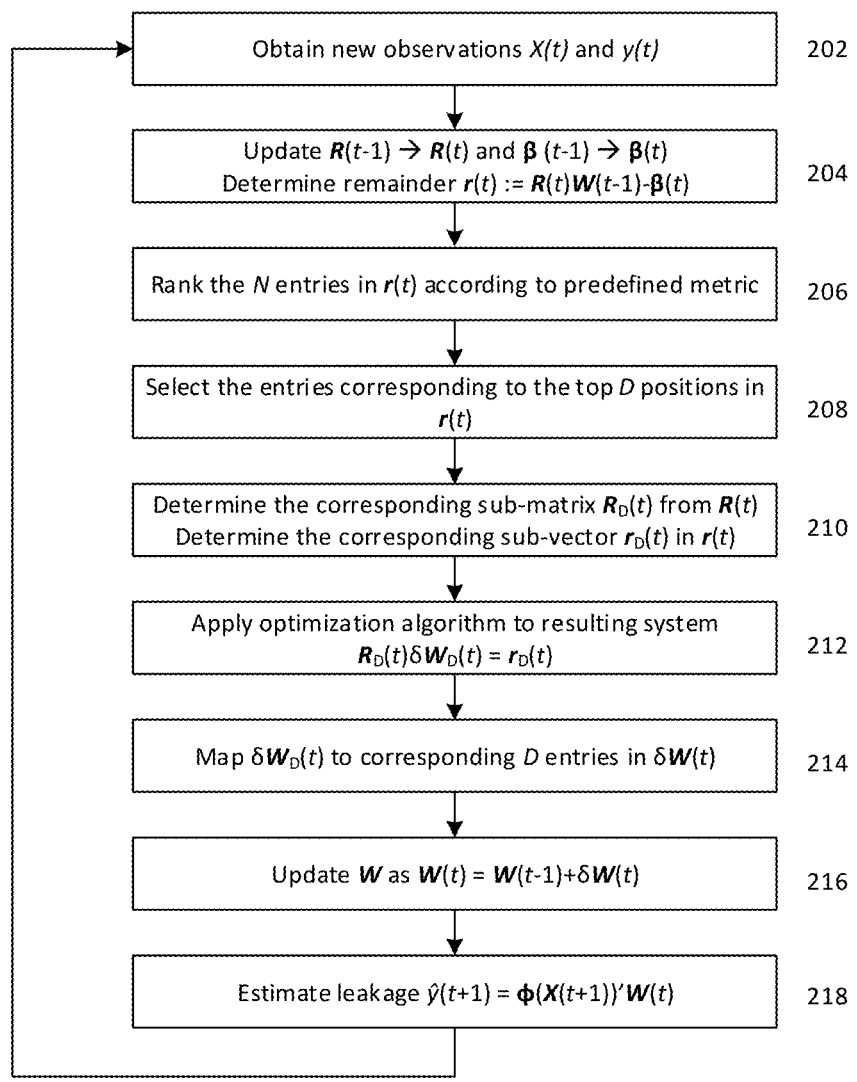
FIG. 2 shows a flow diagram illustrating a selective optimization process.

FIG. 2 details a flow chart illustrating method 200 for performing an update of parameter vector W. It is appreciated that while method 200 will be described in relation to estimating leakage in a self-interference cancelation application, the methods and implementations detailed herein may be utilized in a variety of different applications. For example, it is appreciated that such approaches may be applied to any number of systems requiring similar linear estimation problems. Method 200 may thus be applied as an alternative to a number of LMS, RLS, CD, or CD parameter estimation approaches.

Method 200 may begin with a system such as in Equation 4. In a self-interference cancelation, method 200 may aim to find a parameter vector W to accurately estimate the relationship between kernelized input signal vector $\phi(X(t))$ and leakage $y_1(t)$, such as detailed regarding FIG. 1. Accordingly, an appropriate W for the system $y_1(t)=W'\phi(X(t))$ may be obtained by finding a solution W(t) that resolves the system $R(t)W(t)=\beta(t)$, where R(t) is the covariance matrix of kernelized RX chain input signal vector $\phi(X(t))$ and $\beta(t)$ is the correlation between between the kernelized TX chain input signal vector $\phi(X(t))$ and RX chain input signal vector $Y_1(t)$.

Method 200 may be implemented as an iterative algorithm, and may perform continuous updates to parameter vector W based on new observations. For example, method 200 may receive new observations for X(t) and Y(t) during each iteration, and may subsequently perform an update on parameter vector W based on the new observations during each iteration.

Method 200 may therefore begin at time t with past values R(t−1), $\beta$(t−1), and W(t−1), i.e. with the values for R, $\beta$, and W from the previous iteration of method 200. At 202, method 200 may obtain new observations X(t) and y(t). For example, method 200 may observe the next TX signal scheduled for transmission over TX chain 108, i.e. X(t). Method 200 may then update input signal vector X(t) to include the next TX signal X(t), and subsequently update kernelized input signal vector $\phi(X(t))$. Method 200 may also receive observation y(t) and update observation vector Y(t).

Accordingly, method 200 may update covariance matrix R(t) and correlation vector $\beta(t)$ in 204, i.e. by applying the newest observations x(t) (in the form of $\phi(X(t))$) and y(t) to R(t−1) and $\beta$(t−1). Accordingly, method 200 must determine an appropriate updated W(t) based on W(t−1), R(t), and $\beta(t)$. Method 200 may therefore seek to obtain an accurate current W(t) in order to apply W(t) to the linear relationship $\hat{y}_1(t)=W'\phi(X(t))$, thereby enabling generation of leakage estimate $\hat{y}_1(t)$ for use in self-interference cancelation.

As opposed to updating every element in W, method 200 may instead select a subset of elements in W to update. In other words, method 200 may identify a plurality of critical elements of W to update. Method 200 may then determine and apply an appropriate update for each of the critical elements of W. Method 200 may determine an update vector $\delta$W during each iteration thereof and update W at time t as W(t)=W(t−1)+$\delta$W. Update vector $\delta$W may be non-zero at only D positions, and consequently only D positions of W may be updated during each iteration of method 200. Accordingly, a total of D critical elements of W may be updated during each iteration of method 200. The parameter D may be selected according to system dynamics, such as e.g. D=2, 4, 6, etc. Larger values of D may require increased complexity due to the increase in the number of elements of W to be updated but may improve accuracy. In contrast, smaller values of D may reduce complexity but similarly reduce accuracy, thereby leaving the self-interference cancelation susceptible to spikes.

Accordingly, method 200 may aim to identify D critical elements of W to update. D may therefore be a predefined quantity determining the quantity of critical elements of W to be updated. In order to identify the D critical elements of W, 204 may determine a "remainder" vector r(t) as r(t)=R(t)W(t−1)−$\beta$(t). Remainder vector r(t) may thus have dimension N×1 correspondent to the dimensions of R(t) (N×N), $\beta$(t)(N×1), and W(N×1).

After determining remainder vector r(t), 206 may rank the N entries of r(t) according to a predefined criteria. The predefined criteria may be e.g. magnitude, and accordingly each element of r(t) may be ranked according to the absolute value of each element. It is appreciated that a number of different ranking criteria may be utilized to identify the highest-ranked elements of r(t).

After ranking the elements of r(t), 208 may select the entries of r(t) corresponding to the highest-ranked D elements. In other words, 208 may select the D entries of r(t) with the largest magnitudes in an implementation where the predefined criteria is magnitude.

The entries of W(t−1) corresponding to the the highest-ranked D elements of r(t) may thus be selected to be updated, i.e. the entries of W(t−1) corresponding to the highest ranked D elements of r(t) may be identified as the critical elements of W. It is appreciated that 206 and 208 may function to identify the critical elements of W(t−1), i.e. the elements of W(t−1) that have the largest need for update. Accordingly, the critical elements of W(t−1) may be selected for update to arrive at W(t) while less-essential elements of W(t−1) may not be updated. Method 200 may thus reduce the overall complexity involved in the update process for W while ensuring that necessary updates are completed.

After identifying the D critical elements of W based on remainder vector r(t), method 200 may proceed to compute the corresponding updates thereof. As previously detailed, method 200 may update W from W(t−1) to current W(t) by computing update vector $\delta$W, and subsequently calculating W(t) as W(t)=W(t−1)+$\delta$W. Update vector $\delta$W having D non-zero entries may therefore be obtained to coincide with the D critical elements of W to be updated.

210 may thus determine the corresponding D×D sub-matrix $R_D$(t) from R(t) and the corresponding D×1 sub-vector $r_D$(t) from r(t) based on the D critical entries of r(t) identified in 208. Specifically, if positions $(j_1, j_2, \ldots, j_D)$ are selected as critical in r(t) to yield $r_D$(t), $R_D$(t) will then consist of the entries $\{(a, b)$, where a and b are in $(j_1, j_2, \ldots, j_D)\}$ in R(t).

Accordingly, 210 may yield $R_D$(t) and $r_D$(t). 212 may then apply the determined sub-matrix $R_D$(t) and sub-vector $r_D$(t) to produce a new system of reduced dimensions as follows:

$$R_D(t)\delta W_D = r_D(t) \quad (5),$$

where $\delta W_D$ is a D×1 unknown vector. It is appreciated that each of the D elements of $\delta W_D$ corresponds to one of the D critical entries of W(t).

212 may then solve the equation system of Equation 5 for $\delta W_D$, such as by using a linear estimation algorithm. As the elements of Equation 5 are considered substantially linear, any number of linear estimation approaches may be applied in order to determine an effective solution to Equation 5. For example, the aforementioned CG algorithm may be applied to the D-dimensional system of Equation 5. While CG may prove excessively complex for the 100+-dimension system R(t)W=$\beta$(t), the system of Equation 5 with a suitably chosen D, such as e.g. 2, 4, 6, etc., may be comparably manageable. As the optimization is being applied to a substantially smaller system, method 200 may offer a large reduction in complexity as compared to optimization algorithms operating on the full-dimensioned system $R(t)W=\beta(t)$. It is appreciated that any number of alternate optimization algorithms may be similarly applied, such as any of a variety of linear estimation methods including CD, RLS, LMS, etc.

The application of CG to Equation 5 in 212 may consequently determine a solution $\delta W_D$, where the solution $\delta W_D$ is understood to be an approximate solution of the linear system of Equation 5. 214 may then map the D total entries of $\delta W_D$ to the corresponding D critical entries of $\delta W$. Specifically, $\delta W$ may be initially defined as $\delta W=0_{N\times 1}$. The entries of $\delta W$ may then be populated as $\delta W(j_k)=\delta W_D(k)$, $k=1, \ldots, D$, thereby mapping the D entries of $\delta W_D$ to $\delta W$. Accordingly, the remaining N-D entries of $\delta W_D$ will be set to zero, as these entries were not selected by 208 as critical entries of W according to the ranking criteria applied to remainder vector r(t).

216 may then perform the update of parameter vector W as $W(t)=W(t-1)+\delta W$ using update vector $\delta W$ obtained in 214. Accordingly, D elements of W may be updated in a single iteration of method 200, i.e. with an optimization algorithm such as CG, where the D elements have been identified as being critical entries with a crucial need for update. As CG is only applied to a D-dimensional system, complexity is substantially reduced. However, critical entries of W may still be updated upon each observation, thereby retaining a high degree of accuracy in the updates of parameter vector W.

Method 200 may then apply updated W in order to estimate the leakage for self-interference cancelation according to Equation 6:

$$\hat{y}_1(t+1)=\phi(X(t+1))'W(t) \quad (6),$$

where $\hat{y}_1(t+1)$ is the leakage estimate corresponding to the next transmit symbol X(t+1) to be transmitted over TX chain 108, $\phi(X(t+1))$ is the updated kernelized input signal vector based on new observation X(t+1), and W(t) is the updated parameter vector W as determined in 216.

The leakage estimate $\hat{y}_1(t+1)$ may then be utilized in order to cancel out the leakage originating TX chain 108 due to the subsequent transmission of TX signal X(t+1) from received signal X(t). Accordingly, the leakage signal $y_1(t+1)$ may be substantially canceled or significantly reduced from received signal y(t), thereby allowing for reception of cleaned signal substantially composed of desired downlink signal $y_{DL}(t+1)$.

As shown in FIG. 2, method 200 may be implemented as an iterative process, and may continuously repeat at times t+1, t+2, . . . , in order to continuously reduce self-interference in a mobile device. Accordingly, D positions of W may be selected during each iteration and subsequently updated using a reduced D-dimensional system, as previously described. It is appreciated that the D critical entries of W selected for update will likely vary for each iteration according to the ranking and selection performed by 206 and 208.

While the each iteration of method 200 may utilize a complex optimization algorithm such as CG to compute update vector $\delta W_D$, the complexity may remain manageable due to the reduced dimensions of the applied system. Accordingly, method 200 may be easily integrated into a variety of devices, such as conventional smart phones, tablets, and other mobile devices.

It is appreciated that the parameter D may be dynamic, and accordingly may be adaptable. For example, a mobile device such as mobile device 100 implementing the above-detailed selective optimization processes may be configured to measure a reception characteristic, such by periodically measuring the signal-to-noise ratio or analyzing an error correction rate based on received signal y(t). Mobile device 100 may then determine that reception quality is substantially poor, and accordingly may increase the value of D to a higher value in order to potentially obtain a more accurate leakage estimate $\hat{y}_1(t)$ for self-interference cancelation. Alternatively, mobile device 100 may determine that reception quality is substantially high, and accordingly may reduce the value of D in order to further reduce processing requirements involved in the optimization algorithm processing. Method 200 may thus be modified to include such an analysis of reception quality and a corresponding update to D, if necessary.

Figure 3:
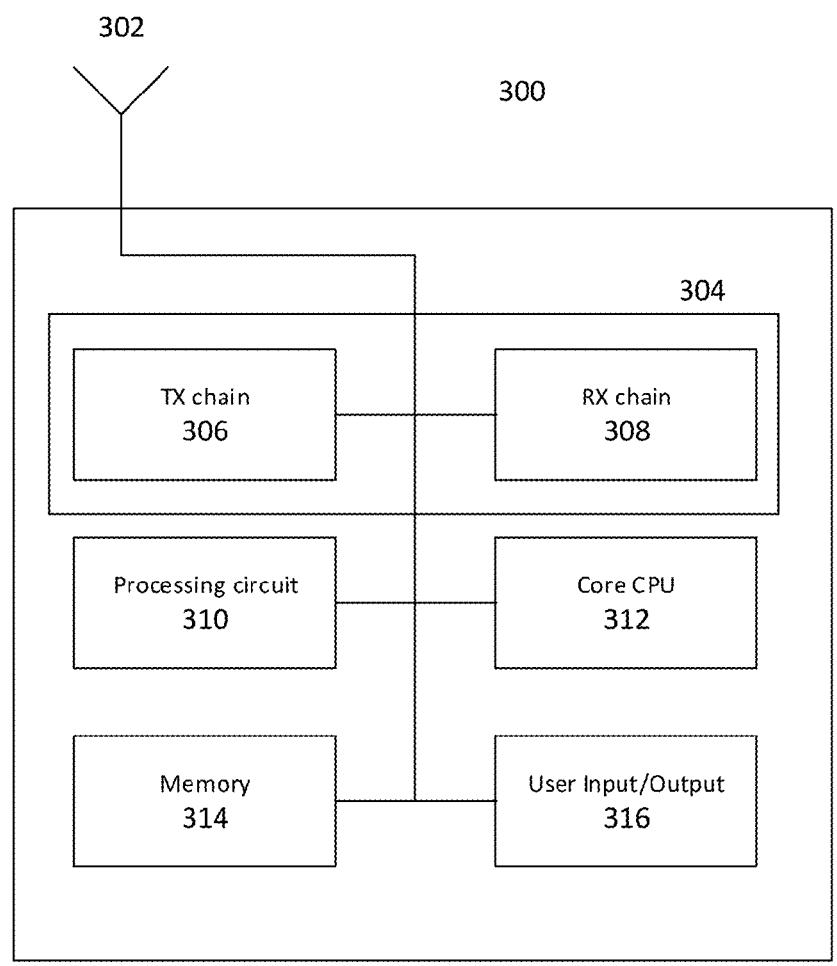
FIG. 3 shows a block diagram illustrating internal components of a communication terminal.

FIG. 3 shows communication terminal 300. Communication terminal 300 may include at least antenna 302, transceiver 304 including transmit chain 306 and receive chain 308, processing circuit 310, core Central Processing Unit (CPU) 312, memory 314, and user input/output 316.

Communication terminal 300 may transmit and receive wireless signals using antenna 302 and transceiver 304. Specifically, transmit chain 306 and receive chain 308 of transceiver 304 may utilize antenna 302 to transmit signals from communication terminal 300 and receive signals at communication terminal 300, respectively, such as by utilizing duplexing circuitry. It is appreciated that antenna 302 may be a single antenna or may be an antenna array composed of a plurality of antennas.

Communication terminal 300 may be configured to perform wireless communications according to any of a number of different radio access technologies. For example, communication terminal 300 may be configured to perform wireless communications according to a cellular communications protocol, such as a 3GPP wireless network e.g. GSM, UMTS, or LTE. Communication terminal 300 may additionally or alternatively be configured to perform wireless communications according to short range communications protocol, such as WiFi or Bluetooth.

Core CPU 312 may be utilized to support core functionality of communication terminal 300, such as by supporting one or more radio access technologies. Core CPU 312 may thus be configured to execute a protocol stack according to the one or more supported radio access technologies. Core CPU 312 may include audio processing circuits, such as audio encoding and/or audio decoding circuits. Core CPU 312 may act a controller, and may be configured to control one or more of the additional components of communication terminal 300. Core CPU 312 may be implemented as e.g. a microprocessor or any other type of programmable logic. In an exemplary aspect of the disclosure, processing 310 may be incorporated as part of core CPU 312.

As shown in FIG. 3, communication terminal 300 may further include memory 314. Memory 314 may be composed of e.g. a read only memory (ROM) and/or a random access memory (RAM). Memory 314 additionally may be composed of several separately implemented memory components, and may be available for use by one or more further components of communication terminal 300. Memory 314 may additionally store one or more sets of program code, such as program code utilized to control core CPU 312 and/or processing circuit 310. Memory 314 may additionally be utilized to store wireless communication data, such as data received by receive chain 308 and/or data intended for transmission by transmit chain 306.

Communication terminal 314 may additionally include components to interact with a user, such as user input/output 316. User input/output 316 may include one or more input and/or output devices, such as keypads, physical buttons, displays, touch sensitive displays, loudspeakers, microphones, cameras, etc.

The internal components of communication terminal 300 may be coupled with one another via one or more lines, such as e.g. one or more data buses. Accordingly, one or more of the internal components of communication terminal 300 may interact with one another by exchanging data therewith. The exchange of data within the internal components of communication terminal 300 may be controlled by e.g. core CPU 312.

Similarly to mobile device 100, as communication terminal 300 may include transceiver components (transceiver 304), communication terminal 300 may be susceptible to leakage from transmit chain 306 to receive chain 308. Accordingly, communication terminal 300 may be configured to mitigate and/or cancel transmit chain leakage from signals received by receive chain 308.

Communication terminal 300 may therefore be configured to generate an estimated leakage signal based on a signal intended for transmission over transmit chain 306. Communication terminal 308 may then utilize the estimated leakage signal to mitigate and/or cancel an actual leakage signal from a signal received by receive chain 308.

Communication terminal 300 may therefore be provided with processing circuit 310, which may interact with transmit chain 306 and receive chain 308 in order to mitigate and/or cancel leakage from signals received by receive chain 308.

Transmit chain 306 may therefore be configured to transmit one or more transmit signals. Receive chain 308 may be configured to receive one or more receive signals.

Processing circuit 310 may be configured to implement selective optimization of a parameter vector estimating the leakage between transmit chain 306 and receive chain 308, such as the selective optimization process of method 200. Specifically, processing circuit 310 may be configured to calculate a covariance matrix based on the one or more transmit signals and the one or more receive signals. Specifically, processing circuit 310 may be configured to first identify a transmit signal vector including one or more of the transmit signals. Processing circuit 310 may then apply a kernelization function on one or more of the transmit signals in the transmit signal vector to generate a kernelized transmit signal vector. Processing circuit 310 may then calculate the covariance matrix as the covariance matrix of the kernelized transmit signal vector.

Processing circuit 310 may also identify a receive signal vector including one or more of the receive signals. Processing circuit 310 may then generate a correlation vector between the kernelized transmit signal vector and the receive signal vector. Processing circuit 310 may calculate the correlation vector by determining the correlation between the elements of the kernelized transmit signal vector and the elements of the receive signal vector.

Processing circuit 310 may continuously calculate a new covariance matrix and a new correlation vector upon obtaining recently transmitted signals by transmit chain 306 and recently received signals by receive chain 308. In other words, processing circuit 310 may calculate an updated covariance matrix and an updated correlation vector upon receiving a new observation from one of or both of transmit chain 306 and receive chain 308. Processing circuit 310 may update the kernelized transmit signal vector upon obtaining a new transmit signal observation and may update the receive signal vector upon receiving a new receive signal observation.

In order to approximate the leakage from transmit chain 306 to receive chain 308, processing circuit 310 may determine a parameter vector representing a relationship between the transmit signal vector and the receive signal vector, such as the relationship between the transmit signal vector and a target signal component associated with the receive signal vector. Processing circuit 310 may determine a parameter vector that approximates the linear relationship between the kernelized transmit signal vector and signal leakage contained in the receive signal vector.

Processing circuit 310 may similarly perform continuous updates to the parameter vector over time to reflect new observations from transmit chain 306 and receive chain 308. Processing circuit 310 may update the parameter vector by first updating the covariance matrix and the correlation vector based on new observations from transmit chain 306 and/or receive chain 308. Processing circuit 310 may then utilize the updated parameter vector to estimate leakage between transmit chain 306 and receive chain 308, and subsequently use the estimated leakage to cancel out actual leakage present in signal received by received chain 308.

In order to update the parameter vector to calculate an updated parameter vector, processing circuit 310 may identify a plurality of critical elements of the existing parameter vector to update. In order to identify the plurality of critical elements, processing circuit 310 may calculate a parameter remainder vector based on the existing parameter vector, an updated covariance matrix, and an updated correlation vector. Processing circuit 310 may utilize the covariance matrix and the correlation vector along with the existing parameter vector in order to calculate the parameter remainder vector, such as by calculating the parameter remainder vector as a linear combination of the covariance matrix, correlation vector, and existing parameter vector.

Processing circuit 310 may then utilize a predefined criteria in order to evaluate the parameter remainder vector. Processing circuit 310 may utilized a predefined ranking criteria in order to rank the elements of the parameter remainder vector, such as e.g. ranking the elements of the parameter remainder vector based on magnitude. Processing circuit 310 may then select a plurality of highest ranked elements, where the number of highest ranked elements of the plurality of highest ranked elements is predefined. For example, processing circuit 310 may select an integer quantity of highest ranked elements of the parameter remainder vector as the plurality of highest ranked elements.

Processing circuit 310 may then identify the plurality of critical elements of the parameter vector based on the indices of the plurality of highest ranked elements of the parameter remainder vector. For example, processing circuit 310 may select each of the plurality of critical elements such that the index of each of the plurality of critical elements corresponds to an index of one of the plurality of highest ranked elements of the parameter remainder vector. Accordingly, processing circuit 310 may identify the plurality of critical elements of the parameter vector to be updated.

Processing circuit 310 may then calculate a solution to a linear system to determine an appropriate update for the parameter vector. The linear system may be the linear relationship between the plurality of highest ranked elements of the parameter remainder vector and the corresponding elements of the covariance matrix. Processing circuit 310 may therefore generate a reduced covariance matrix including the corresponding elements of the covariance matrix. Each of the plurality of highest-ranked elements of the parameter remainder vector may correspond to one of the plurality of critical elements of the parameter vector. Processing circuit 310 may solve the linear system using a linear estimation method, such as CG, CD, RLS, LMS, etc. Processing circuit 310 may generate a reduced parameter update vector as the solution to the linear system.

As the linear system has dimensions corresponding to the number of critical elements of the plurality of critical elements, the linear system has reduced dimensions compared to the dimensions of the original linear system between the kernelized transmit signal vector and the receive signal vector. Accordingly, the linear system may require substantially less processing.

Processing circuit 310 may then update the parameter vector using the reduced parameter update vector that was determined as the solution to the linear system, wherein the reduced parameter update vector has fewer elements than the parameter vector. Processing circuit 310 may update the parameter vector by mapping each element of the reduced parameter update vector to the corresponding element of the plurality of critical elements. Processing circuit 310 may e.g. perform element-wise addition of each element of the reduced parameter update vector to the corresponding critical element of the plurality of critical elements of the parameter vector. Processing circuit 310 may obtain an updated parameter vector.

Processing circuit 310 may then apply the updated parameter vector in order to cancel signal leakage from receive chain 308. For example, processing circuit 310 may obtain the next transmit signal scheduled for transmission by transmit chain 308. Processing circuit 310 may then update the kernelized transmit signal vector based on the next transmit signal, and may then apply the updated parameter vector to the updated kernelized transmit signal vector, such as e.g. by performing vector multiplication with the kernelized transmit signal vector with the parameter vector.

Processing circuit 310 may thus obtain an estimated leakage signal. Processing circuit 310 may then receive the next receive signal received by receive chain 308, and may utilize the estimated leakage signal to cancel out actual leakage from the next receive signal to produce a clean received signal. Processing circuit 310 may then provide the clean received signal to one or more additional components of communication terminal 300 for further processing, such as to core CPU 312.

Accordingly, processing circuit 310 may effectively cancel out leakage from signals received by receive chain 308. As the linear estimation utilized to approximate the relationship between the transmit signals and the receive signals is performed on a reduced-dimension system, processing requirements may be substantially reduced. However, proper identification of critical elements of the parameter vector to be updated may allow processing circuit 310 to accurately approximate the transmit chain to receive chain leakage relationship, and thereby effectively mitigate and/or cancel signal leakage.

It is appreciated that communication terminal 300 may include more than one transceiver, e.g. one or more transceivers in addition to transceiver 304. One or more of the transceivers may be associated with a different radio access technology, and accordingly communication terminal 300 may be configured to operate according to a plurality of radio access technologies. It is appreciated that signal leakage as detailed above may occur between different radio access technologies, such as between a transmit chain of a transceiver for a first radio access technology and a receive chain of a transceiver for a second radio access technology, where the first radio access technology is different than the second radio access technology. Communication terminal 300 may similarly apply the above-detailed approaches in order to mitigate and/or cancel any resulting signal leakage, such as by selectively updating a parameter vector that describes the relationship between signal leakage caused by the transceiver for the first radio access technology to the transceiver for the second radio access technology.

Figure 4:
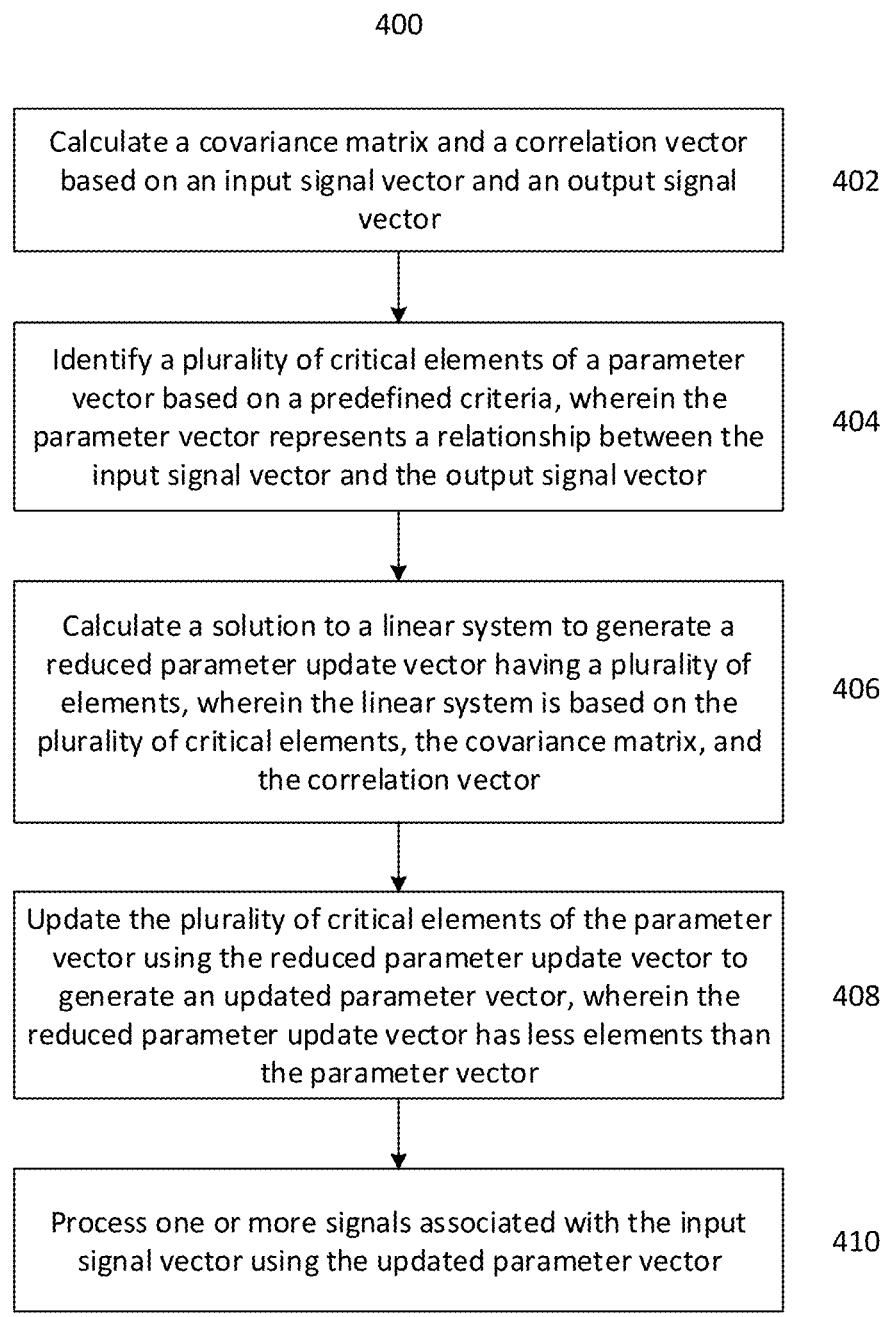
FIG. 4 shows a flow diagram illustrating a method of processing signals.

FIG. 4 shows a flow chart illustrating method 400. Method 400 may be a method of processing signals according an aspect of this disclosure.

Method 400 may calculate a covariance matrix and a correlation vector based on an input signal vector and an output signal vector in 402. Specifically, method 400 may calculate a kernelized input signal vector by applying a predefined nonlinear mapping function to the input signal vector. Method 400 may calculate the covariance matrix as the covariance matrix of the kernelized input signal vector, and may calculate the correlation vector as the correlation vector between the kernelized input signal vector and the output signal vector.

Method 400 may then identify a plurality of critical elements of a parameter vector based on a predefined criteria in 404. The parameter vector may represent a relationship between the input signal vector and the output signal vector. Specifically, the parameter vector may represent a linear relationship between the kernelized input signal vector and a target signal component of the output signal vector. In a signal leakage application, the parameter vector may describe the linear relationship between the kernelized input signal vector and the signal leakage contained in the output signal vector.

Method 400 may calculate a parameter remainder vector as a linear combination of the parameter vector, the covariance matrix, and the correlation vector in order to determine the plurality of critical elements. Method 400 may then perform an element-wise analysis on the elements of the parameter remainder vector to identify corresponding critical elements of the parameter vector according to the predefined criteria.

For example, the predefined criteria may be based on magnitude. 404 may accordingly identify a predefined quantity of elements of the parameter remainder vector that have the largest magnitudes. 404 may then generate a reduced parameter remainder vector based on the predefined quantity of elements, such as by selecting each of the predefined quantity of elements to be in the reduced parameter remainder vector.

Method 400 may then utilize the reduced parameter remainder vector to solve a linear system in order to determine a reduced parameter update vector in 406, where the reduced parameter update vector has fewer elements than the parameter vector. The reduced parameter vector also has a plurality of elements. Method 400 may generate a reduced covariance matrix by identifying the elements in the covariance matrix that correspond to the plurality of critical elements in the parameter vector, which may accordingly correspond to the elements of the reduced parameter remainder vector.

The linear system may thus include the reduced parameter remainder vector and the reduced covariance matrix. 406 may approximate a solution to the linear system to generate the reduced parameter update vector, where the reduced parameter update vector is the solution to the linear system.

406 may use any linear approximation method to approximate the solution to the linear system. For example, 406 may utilize CG, CD, LMS, RLS, etc. in order to arrive at a solution to the linear system.

After determining the reduced parameter update vector in 406, method 400 may update the plurality of critical elements of the parameter vector using the reduced parameter updated vector in 408 to generate an updated parameter vector, wherein the reduced parameter update vector has less elements than the parameter vector. 408 may update only the plurality of critical elements of the parameter vector to generate the updated parameter vector, while the remaining elements of the updated parameter vector remain unchanged from the parameter vector.

Method 400 may then process one or more signals associated with the input signal vector using the updated parameter vector in 410. The one or more signals may originate from the same source as the input signals of the input signal vector.

For example, the input signal vector may be based on one or more transmit signals previously transmitted by a transmit chain of a transceiver and the output signal vector may be based on one or more receive signals previously received by a receive chain of the transceiver. The parameter vector may describe the relationship between the one or more transmit signals and signal leakage contained in the one or more receive signals, such as describing a linear relationship between a kernelized input signal vector based on the input signal vector and the signal leakage.

The parameter vector may therefore be utilized in order to estimate the signal leakage from the transmit chain to the receive chain. Method 400 in 410 may therefore apply the parameter vector to the kernelized input signal vector to approximate the signal leakage in the one or more receive signals. 410 may then perform processing to mitigate or cancel the signal leakage using the signal leakage approximation.

As the linear system operated on in 406 has reduced dimensions corresponding to the plurality of critical elements, method 400 may be able to utilize less processing power in order to obtain the solution to the linear system. Accordingly, as opposed to solving a linear system in order to update every element of the parameter vector, method 400 may instead identify only critical elements of the parameter vector and solve a reduced-dimension linear system in order to perform an update on these critical elements. It is appreciated that adjusting the predefined quantity of elements of the parameter remainder vector may determine the dimensions of the linear system, thereby similarly affecting the complexity involved in solving the linear system.

It is appreciated that the above-detailed selective optimization approaches may be expanded to any number of optimization scenarios. For example, while the above disclosure has focused on a self-interference cancelation approach, it is understood that any number of optimization applications may be improved through selective update of a parameter vector. For example, the above-detailed selective optimization approach may be applied to approximate any non-linear equation system representable in similar form as to Equation 1, where a mapping function such as $\Phi$ may be used to approximate a linear relationship. Furthermore, the above-detailed selective optimization approach may be additionally applied to approximate linear equation systems, such as where the known parameters are linear and thus no linear mapping function such as $\Phi$ may be necessary. Accordingly, it is appreciated that a solution any number of equation systems may be approximated utilizing the selective optimization approach of this disclosure. Estimation scenarios utilizing CG or CD may be particularly relevant, as the selective optimization approach detailed herein may offer reduced complexity over CG while avoiding problematic spikes associated with CD. Accordingly, selective optimization may be applied in order to provide desirable convergence time along with robust estimation results.

The following examples pertain to further aspects of the disclosure:

Example 1 is a method of processing signals. The method includes calculating a covariance matrix and a correlation vector based on an input signal vector and an output signal vector, identifying a plurality of critical elements of a parameter vector based on a predefined criteria, wherein the parameter vector represents a relationship between the input signal vector and the output signal vector, calculating a solution to a linear system to generate a reduced parameter update vector having a plurality of elements, wherein the linear system is based on the plurality of critical elements of the parameter vector, the covariance matrix, and the correlation vector, updating the plurality of critical elements of the parameter vector using the reduced parameter update vector to generate an updated parameter vector, wherein the reduced parameter update vector has less elements than the parameter vector, and processing one or more signals associated with the input signal vector using the updated parameter vector.

In Example 2, the subject matter of Example 1 can optionally include wherein the identifying a plurality of critical elements of a parameter vector based on a predefined criteria includes selecting a predefined quantity of elements of the parameter vector as the plurality of critical elements.

In Example 3, the subject matter of Example 2 can optionally include wherein the updating the plurality of critical elements of the parameter vector using the reduced parameter update vector to generate an updated parameter vector includes updating only the plurality of critical elements of the parameter vector.

In Example 4, the subject matter of any one of Examples 1 to 3 can optionally include further including with a transmit chain of a transceiver, transmitting one or more transmit signals, and with a receive chain of the transceiver, receiving one or more receive signals, wherein the input signal vector is based on the one or more transmit signals and the output signal vector is based on the one or more receive signals.

In Example 5, the subject matter of Example 4 can optionally include wherein processing the one or more signals associated with the input signal vector using the updated parameter vector includes applying the updated parameter vector to a new input signal intended for transmission by the transmit chain of the transceiver to generate an estimated leakage signal, wherein the estimated leakage approximates signal leakage from the transmit chain to a the receive chain of the transceiver, and utilizing the estimated leakage signal to cancel an actual leakage signal from a received signal received by the receive chain of the transceiver.

In Example 6, the subject matter of Example 5 can optionally include wherein applying the updated parameter vector to the new input signal intended for transmission by the transmit chain of the transceiver to generate an estimated leakage signal includes updating the input signal vector based on the new input signal to generate an updated input signal vector, applying a mapping function to the updated input signal vector to generate a kernelized input signal vector, where the parameter vector describes a linear relationship between the kernelized input signal vector and the signal leakage, and applying the updated parameter vector to the kernelized input signal vector to generate the estimated leakage signal.

In Example 7, the subject matter of any one of Examples 1 to 6 can optionally include wherein identifying a plurality of critical elements of a parameter vector includes identifying a predefined quantity of elements of a parameter vector as the plurality of critical elements of the parameter vector.

In Example 8, the subject matter of any one of Examples 1 to 7 can optionally include further including applying a predefined mapping function to the input signal vector to generate a kernelized input signal vector.

In Example 9, the subject matter of Example 8 can optionally include wherein applying a predefined mapping function to the input signal vector to generate a kernelized input signal vector includes applying a non-linear predefined mapping function to the input signal vector, wherein the parameter vector describes a linear relationship between the kernelized input signal vector and a target signal component associated with the output signal vector.

In Example 10, the subject matter of Example 9 can optionally include further including with a transmit chain of a transceiver, transmitting one or more transmit signals, and with a receive chain of the transceiver, receiving one or more receive signals, wherein the input signal vector is based on one or more transmit signals previously transmitted by a transmit chain of a transceiver and the output signal vector is based on one or more receive signals previously received by a receive chain of the transceiver.

In Example 11, the subject matter of Example 10 can optionally include wherein the parameter vector represents a linear relationship between the kernelized input signal vector and signal leakage contained in the one or more receive signals.

In Example 12, the subject matter of Example 8 can optionally include wherein the covariance matrix is the covariance matrix of the kernelized input signal vector and the correlation vector is the correlation vector between the kernelized input signal vector and the output signal vector.

In Example 13, the subject matter of any one of Examples 1 to 12 can optionally include wherein identifying the plurality of critical elements of the parameter vector based on the predefined criteria includes generating a parameter remainder vector by performing a linear operation on the parameter vector, the covariance matrix, and the correlation vector, selecting a predefined quantity of highest-ranked elements of the parameter remainder vector according to the predefined criteria, and selecting the elements of the parameter vector that each correspond to a respective highest-ranked element of the predefined quantity of highest-ranked elements as the plurality of critical elements of the parameter vector.

In Example 14, the subject matter of Example 13 can optionally include wherein selecting a predefined quantity of highest-ranked elements of the parameter remainder vector according to the predefined criteria includes selecting a predefined quantity of highest-ranked elements of the parameter remainder vector that is less than the quantity of elements in the parameter vector.

In Example 15, the subject matter of Example 13 can optionally include wherein the predefined criteria is based on magnitude, and wherein selecting the predefined quantity of highest-ranked elements of the parameter remainder vector according to the predefined criteria includes selecting the predefined quantity of elements of the parameter remainder vector having the greatest magnitude as the predefined quantity of highest-ranked elements.

In Example 16, the subject matter of Example 13 can optionally include further including selecting the predefined quantity of highest-ranked elements of the parameter remainder vector to generate a reduced parameter remainder vector, wherein the reduced parameter remainder vector contains only the predefined quantity of highest-ranked elements of the parameter remainder vector.

In Example 17, the subject matter of Example 16 can optionally include further including selecting the elements of the covariance matrix that correspond to the plurality of critical elements of the parameter vector to generate a reduced covariance matrix.

In Example 18, the subject matter of Example 17 can optionally include wherein calculating a solution to a linear system to generate a reduced parameter update vector having a plurality of critical elements includes calculating a solution to a linear system that includes the reduced parameter remainder vector and the reduced covariance matrix.

In Example 19, the subject matter of Example 18 can optionally include wherein the linear system describes the linear relationship between the reduced parameter remainder vector and the reduced covariance matrix and wherein calculating the solution to the linear system to generate the reduced parameter update vector includes performing linear approximation to obtain the reduced parameter update vector as the solution to the linear system.

In Example 20, the subject matter of Example 19 can optionally include wherein performing linear approximation to obtain the reduced parameter update vector as the solution to the linear system includes performing conjugate gradient estimation on the linear system.

In Example 21, the subject matter of Example 19 can optionally include wherein updating the plurality of critical elements of the parameter vector using the reduced parameter update vector to generate the updated parameter vector includes updating only the plurality of critical elements of the parameter vector using the reduced parameter update vector to generate the updated parameter vector.

In Example 22, the subject matter of any one of Examples 1 to 21 can optionally include wherein updating the plurality of critical elements of the parameter vector using the reduced parameter update vector to generate the updated parameter vector includes updating only the plurality of critical elements of the parameter vector using the reduced parameter update vector to generate the updated parameter vector.

In Example 23, the subject matter of any one of Examples 1 to 22 can optionally include wherein identifying the plurality of critical elements of the parameter vector based on the predefined criteria includes generating a parameter remainder vector based on the parameter vector, the covariance matrix, and the correlation vector, applying the predefined criteria to the parameter remainder vector to identify a plurality of highest-ranked elements of the parameter remainder vector, and selecting the elements of the parameter vector that each correspond to a respective element of the plurality of highest-ranked elements of the parameter remainder vector as the plurality of critical elements of the parameter vector.

In Example 24, the subject matter of Example 23 can optionally include wherein the selecting the elements of the parameter vector that each correspond to a respective element of the plurality of highest-ranked elements of the parameter remainder vector as the plurality of critical elements of the parameter vector includes selecting the plurality of critical elements wherein the plurality of critical elements of the parameter vector each have a vector index that corresponds to a vector index of a respective highest-ranked element of the plurality of highest-ranked elements of the parameter remainder vector.

In Example 25, the subject matter of Example 23 can optionally include wherein the predefined criteria is based on magnitude, and wherein applying the predefined criteria to the parameter remainder vector to identify the plurality of highest-ranked elements of the parameter remainder vector includes selecting a predefined quantity of elements of the parameter remainder vector that have the highest-magnitudes as the plurality of highest-ranked elements of the parameter remainder vector.

In Example 26, the subject matter of Example 23 can optionally include wherein the linear system describes a linear relationship between the reduced parameter remainder vector and a plurality of elements of the covariance matrix that correspond with the elements of the reduced parameter remainder vector, and wherein calculating the solution to the linear system to generate the reduced parameter update vector having less elements than the parameter vector includes applying conjugate gradient estimation to obtain the reduced parameter update vector as the solution to the linear system.

In Example 27, the subject matter of Example 1 can optionally include further including generating a kernelized input signal vector by applying a predefined mapping function to one or more elements of the input signal vector, wherein the parameter vector describes a substantially linear relationship between the kernelized input signal vector and a target signal component of the output signal vector.

In Example 28, the subject matter of Example 27 can optionally include wherein calculating the covariance matrix and the correlation vector based on the input signal vector and the output signal vector includes calculating the covariance matrix as the covariance matrix of the kernelized input signal vector and calculating the correlation vector as the correlation vector between the kernelized input signal vector and the output signal vector.

In Example 29, the subject matter of Example 1 can optionally include wherein processing the one or more signals associated with the input signal vector using the updated parameter vector includes generating a mapped input signal vector based on the input signal vector, wherein the updated parameter vector describes a linear relationship between the mapped input signal vector and a target signal component associated with the output signal vector, and applying the updated parameter vector to the mapped input signal vector in order to estimate the target signal component associated with the output signal vector.

In Example 30, the subject matter of Example 29 can optionally include wherein the input signal vector is based on one or more transmit signals previously transmitted by a transmit chain of a transceiver and the output signal vector is based on one or more receive signals previously received by a receive chain of the transceiver, and wherein the updated parameter vector describes the linear relationship between the mapped input signal vector and a signal leakage component contained in the one or more receive signals.

Example 31 is a transceiver device. The transceiver device includes a transmit chain configured to transmit one or more transmit signals, a receive chain configured to receive one or more receive signals, and a processor configured to calculate a covariance matrix and a correlation vector based on the one or more transmit signals and the one or more receive signals, identify a plurality of critical elements of a parameter vector based on a predefined criteria, wherein the parameter vector represents a relationship between the one or more transmit signals and the one or more receive signals, calculate a solution to a linear system to generate a reduced parameter update vector having a plurality of elements, wherein the linear system is based on the plurality of critical elements, the covariance matrix, and the correlation vector, update the parameter vector using the reduced parameter update vector to generate an updated parameter vector, wherein the reduced parameter update vector has fewer elements than the parameter vector, and process at least one of the one or more transmit signals using the updated parameter vector.

In Example 32, the subject matter of Example 31 can optionally include wherein the processor is configured to identify a plurality of critical elements of a parameter vector by selecting a plurality of elements from the parameter vector as the plurality of critical elements, wherein the quantity of the plurality of critical elements is less than the quantity of elements of the parameter vector, and wherein processor is configured to update the parameter vector using the reduced parameter update vector to generate an updated parameter vector by updating only the plurality of critical elements of the parameter vector.

In Example 33, the subject matter of Example 31 can optionally include wherein each of the plurality of critical elements of the parameter vector corresponds to a respective element of the reduced parameter update vector, and wherein the processor is configured to update the parameter vector by updating only the plurality of critical elements of the parameter vector using the reduced parameter update vector to generate the updated parameter vector.

In Example 34, the subject matter of Example 33 can optionally include wherein the processor is configured to identify the plurality of critical elements of the parameter vector based on the predefined criteria by generating a parameter remainder vector based on the parameter vector, the covariance matrix, and the correlation vector, identifying a predefined quantity of elements of the parameter remainder vector having the highest magnitudes according to the predefined ranking criteria, and selecting the elements of the parameter vector that correspond to the predefined quantity of elements of the parameter remainder vector as the plurality of critical elements of the parameter vector.

In Example 35, the subject matter of Example 34 can optionally include wherein the processor is configured to select the predefined quantity of elements of the parameter remainder vector to generate a reduced parameter remainder vector, wherein the reduced parameter remainder vector consists of the predefined quantity of elements of the parameter remainder vector.

In Example 36, the subject matter of Example 35 can optionally include wherein the processor is configured to select the elements of the covariance matrix that correspond to the plurality of critical elements of the parameter vector to generate a reduced covariance matrix.

In Example 37, the subject matter of Example 36 can optionally include wherein the linear system includes the reduced parameter remainder vector and the reduced covariance matrix and wherein the linear system represents the linear relationship between the reduced parameter remainder vector and the reduced covariance matrix, and wherein the processor is configured to calculate the solution to the linear system to generate the reduced parameter update vector by performing linear approximation to obtain the reduced parameter update vector as the solution to the linear system.

In Example 38, the subject matter of Example 37 can optionally include wherein the processor is configured perform linear approximation to obtain the reduced parameter update vector as the solution to the linear system by performing conjugate gradient estimation on the linear system.

In Example 39, the subject matter of Example 37 can optionally include wherein the processor is configured to update the parameter vector using the reduced parameter update vector to generate the updated parameter vector by updating only the plurality of critical elements of the parameter vector using the reduced parameter update vector to generate the updated parameter vector.

In Example 40, the subject matter of Example 34 can optionally include wherein processor is configured to generate the parameter remainder vector as a linear combination of the parameter vector, the covariance matrix, and the correlation vector.

In Example 41, the subject matter of any one of Examples 31 to 40 can optionally include wherein the processor is configured to identify a plurality of critical elements of a parameter vector based on a predefined criteria by identifying a predefined quantity of elements of the parameter vector as a plurality of critical elements of the parameter vector.

In Example 42, the subject matter of any one of Examples 31 to 41 can optionally include wherein the updated parameter vector estimates signal leakage between the transmit chain and the receive chain, and wherein the processor is configured to process at least one of the one or more transmit signals using the updated parameter vector by applying the updated parameter vector to an input signal vector including the one or more transmit signals to generate an estimated leakage signal, and applying the estimated leakage signal to at least one of the one or more receive signals in order to mitigate signal leakage from the at least one of the one or more receive signals.

In Example 43, the subject matter of any one of Examples 31 to 42 can optionally include wherein the processor is configured to calculate the solution to the linear system to generate the reduced parameter updated vector by applying conjugate gradient estimation to the linear system to obtain the reduced parameter update vector as a solution to the linear system.

In Example 44, the subject matter of any one of Examples 31 to 43 can optionally include wherein the processor is further configured to generate a kernelized input signal vector by applying a predefined mapping function to at least one of the one or more transmit signals, wherein the parameter vector represents a linear relationship between the kernelized input signal vector and signal leakage contained in the one or more receive signals.

In Example 45, the subject matter of Example 44 can optionally include wherein the processor is configured to generate a kernelized input signal vector by applying a non-linear predefined mapping function to at least one of the one or more transmit signals.

In Example 46, the subject matter of Example 44 can optionally include wherein the processor is configured to calculate the covariance matrix and the correlation vector based on the one or more transmit signals and the one or more receive signals by calculating the covariance matrix as the covariance matrix of the kernelized input signal vector, and calculating the correlation vector as the correlation vector between the kernelized input signal vector and an output signal vector including at least one of the one or more receive signals.

Example 47 is a transceiver device. The transceiver device includes a transmit chain configured to transmit one or more transmit signals, a receive chain configured to receive one or more receive signals, and a processor configured to calculate a covariance matrix and a correlation vector based on the one or more transmit signals and the one or more receive signals, identify a plurality of critical elements of a parameter vector based on a predefined criteria, wherein the parameter vector describes a relationship between the one or more transmit signals and the one or more receive signals, calculate a solution to a linear system using conjugate gradient estimation to generate a reduced parameter update vector having a plurality of elements, wherein the linear system is based on the plurality of critical elements, the covariance matrix, and the correlation vector, update the parameter vector using the reduced parameter update vector to generate an updated parameter vector, wherein the reduced parameter update vector has fewer elements than the parameter vector, and generate an estimated leakage signal by applying the updated parameter vector to the one or more transmit signals, and utilize the estimated leakage signal to cancel a leakage signal from at least one of the receive signals.

In Example 48, the subject matter of Example 47 can optionally include wherein the processor is configured to identify a plurality of critical elements of a parameter vector based on predefined criteria by selecting a predefined quantity of critical elements of the plurality of critical elements of the parameter vector.

In Example 49, the subject matter of Example, can optionally include processor is configured to update the parameter vector using the reduced parameter update vector to generate an updated parameter vector by updating only the plurality of critical elements of the parameter vector.

In Example 50, the subject matter of Example 47 can optionally include wherein the processor is configured to update the parameter vector by updating only the plurality of critical elements of the parameter vector using the reduced parameter update vector to generate the updated parameter vector.

In Example 51, the subject matter of any one of Examples 47 to 50 can optionally include wherein the processor is configured to generate the estimated leakage signal by calculating a mapped input signal vector using a new transmit signal of the one or more transmit signals, wherein the parameter vector describes a substantially linear relationship between the mapped input signal vector and signal leakage from the transmit chain to the receive chain, and applying the updated parameter vector to the mapped input signal vector to generate the estimated leakage signal.

In Example 52, the subject matter of any one of Examples 47 to 51 can optionally include wherein the processor is configured to identify the plurality of critical elements of the parameter vector by generating a parameter remainder vector based on the parameter vector, the covariance matrix, and the correlation vector, applying the predefined criteria to the parameter remainder vector to identify a plurality of highest-ranked elements of the parameter remainder vector, and selecting the plurality of critical elements of the parameter vector as the elements of the parameter vector that correspond to the plurality of highest-ranked elements of the parameter remainder vector.

In Example 53, the subject matter of Example 52 can optionally include wherein the predefined criteria is based on magnitude, and wherein the processor is configured to apply the predefined criteria to the parameter remainder vector to identify the plurality of highest-ranked elements of the parameter remainder vector by selecting a predefined quantity of elements of the parameter remainder vector that have the highest magnitudes as the plurality of highest-ranked elements of the parameter remainder vector.

In Example 54, the subject matter of Example 47 can optionally include wherein the processor is further configured to apply a predefined mapping function to the one or more transmit signals to generate a kernelized transmit signal vector, wherein the parameter vector describes a linear relationship between the one or more transmit signals and signal leakage contained in the one or more receive signals.

In Example 55, the subject matter of Example 54 can optionally include wherein the processor is configured to apply a predefined mapping function to the one or more transmit signals to generate a kernelized transmit signal vector by applying a non-linear predefined mapping function to the one or more transmit signals.

In Example 56, the subject matter of Example 54 can optionally include wherein the processor is configured to calculate the covariance matrix and the correlation vector based on the one or more transmit signals and the one or more receive signals by calculating the covariance matrix as the covariance matrix of the kernelized transmit signal vector, and calculating the correlation vector as the correlation vector between the kernelized transmit signal vector and a receive signal vector including at least one of the one or more receive signals.

In Example 57, the subject matter of any one of Examples 47 to 56 can optionally include wherein the processor is configured to identify a plurality of critical elements of a parameter vector based on a predefined criteria by selecting a predefined quantity of elements of the parameter vector as the plurality of critical elements of the parameter vector.

In Example 58, the subject matter of Example 47 can optionally include wherein the processor is configured to identify the plurality of critical elements of the parameter vector based on the predefined criteria by generating a parameter remainder vector by performing a linear operation on the parameter vector, the covariance matrix, and the correlation vector, identifying a predefined quantity of elements of the parameter remainder vector having the largest magnitudes according to the predefined criteria, and identifying the elements of the parameter vector that each correspond to a respective element of the predefined quantity of elements of the parameter remainder vector as the plurality of critical elements of the parameter vector.

In Example 59, the subject matter of Example 47 can optionally include wherein the processor is further configured to select the predefined quantity of elements of the parameter remainder vector to generate a reduced parameter remainder vector, and select a plurality of elements of the covariance matrix corresponding to the plurality of critical elements of the parameter vector to generate a reduced covariance matrix, wherein the linear system includes the reduced parameter remainder vector and the reduced covariance matrix.

In Example 60, the subject matter of Example 59 can optionally include wherein the linear system describes a linear relationship between the reduced parameter remainder vector and the reduced covariance matrix, and wherein the processor is configured to calculate the solution to the linear system using conjugate gradient estimation to generate the reduced parameter update vector by performing conjugate gradient estimation on the linear system to obtain the reduced parameter update vector as the solution to the linear system.

In Example 61, the subject matter of Example 59 can optionally include wherein the processor is configured to generate a reduced parameter remainder vector by selecting a predefined quantity of elements of the parameter remainder vector as the reduced parameter remainder vector.

In Example 62, the subject matter of any one of Examples 47 to 61 can optionally include wherein the processor is configured to generate the estimated leakage signal by applying the updated parameter vector to the one or more transmit signals by applying the updated parameter vector to a transmit signal vector based on the one or more transmit signals to generate the estimated leakage signal.

In Example 63, the subject matter of Example 62 can optionally include wherein the processor is further configured to generate the transmit signal vector by applying a predefined mapping function to the one or more transmit signals, wherein parameter vector describes a substantially linear relationship between the transmit signal vector and the leakage signal.

In Example 64, the subject matter of Example 47 can optionally include wherein processor is configured to utilize the estimated leakage signal to cancel a leakage signal from at least one of the receive signals by utilizing the leakage estimated leakage signal to cancel a leakage signal arising from the transmit chain from at least one of the receive signals.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of processing signals comprising:
   calculating a covariance matrix and a correlation vector based on an input signal vector and an output signal vector;
   identifying a plurality of critical elements of a parameter vector based on a predefined criteria, wherein the parameter vector represents a relationship between the input signal vector and the output signal vector;
   calculating a solution to a linear system to generate a reduced parameter update vector having a plurality of elements, wherein the linear system is based on the plurality of critical elements of the parameter vector, the covariance matrix, and the correlation vector;
   updating the plurality of critical elements of the parameter vector using the reduced parameter update vector to generate an updated parameter vector, wherein the reduced parameter update vector has less elements than the parameter vector; and
   processing one or more signals associated with the input signal vector using the updated parameter vector.

2. The method of claim 1, wherein updating the plurality of critical elements of the parameter vector using the reduced parameter update vector to generate an updated parameter vector comprises:
   updating only the plurality of critical elements of the parameter vector.

3. The method of claim 1, further comprising:
   with a transmit chain of a transceiver, transmitting one or more transmit signals; and
   with a receive chain of the transceiver, receiving one or more receive signals, wherein the input signal vector is based on the one or more transmit signals and the output signal vector is based on the one or more receive signals.

4. The method of claim 3, wherein processing the one or more signals associated with the input signal vector using the updated parameter vector comprises:

applying the updated parameter vector to a new input signal intended for transmission by the transmit chain of the transceiver to generate an estimated leakage signal, wherein the estimated leakage approximates signal leakage from the transmit chain to a the receive chain of the transceiver; and utilizing the estimated leakage signal to cancel an actual leakage signal from a received signal received by the receive chain of the transceiver.

5. The method of claim 4, wherein applying the updated parameter vector to the new input signal intended for transmission by the transmit chain of the transceiver to generate an estimated leakage signal comprises:

updating the input signal vector based on the new input signal to generate an updated input signal vector;

applying a mapping function to the updated input signal vector to generate a kernelized input signal vector, where the parameter vector describes a linear relationship between the kernelized input signal vector and the signal leakage; and applying the updated parameter vector to the kernelized input signal vector to generate the estimated leakage signal.

6. The method of claim 1, wherein identifying the plurality of critical elements of the parameter vector based on the predefined criteria comprises:

generating a parameter remainder vector based on the parameter vector, the covariance matrix, and the correlation vector;

applying the predefined criteria to the parameter remainder vector to identify a plurality of highest-ranked elements of the parameter remainder vector; and selecting the elements of the parameter vector that each correspond to a respective element of the plurality of highest-ranked elements of the parameter remainder vector as the plurality of critical elements of the parameter vector.

7. The method of claim 6, wherein the predefined criteria is based on magnitude, and wherein applying the predefined criteria to the parameter remainder vector to identify the plurality of highest-ranked elements of the parameter remainder vector comprises:

selecting a predefined quantity of elements of the parameter remainder vector that have the highest-magnitudes as the plurality of highest-ranked elements of the parameter remainder vector.

8. The method of claim 6, wherein the linear system describes a linear relationship between the reduced parameter remainder vector and a plurality of elements of the covariance matrix that correspond with the elements of the reduced parameter remainder vector, and wherein calculating the solution to the linear system to generate the reduced parameter update vector having less elements than the parameter vector comprises:

applying conjugate gradient estimation to obtain the reduced parameter update vector as the solution to the linear system.

9. The method of claim 1, further comprising:

generating a kernelized input signal vector by applying a predefined mapping function to one or more elements of the input signal vector, wherein the parameter vector describes a substantially linear relationship between the kernelized input signal vector and a target signal component of the output signal vector.

10. The method of claim 9, wherein calculating the covariance matrix and the correlation vector based on the input signal vector and the output signal vector comprises:

calculating the covariance matrix as the covariance matrix of the kernelized input signal vector and calculating the correlation vector as the correlation vector between the kernelized input signal vector and the output signal vector.

11. A transceiver device comprising:

a transmit chain configured to transmit one or more transmit signals;

a receive chain configured to receive one or more receive signals; and a processor configured to:

calculate a covariance matrix and a correlation vector based on the one or more transmit signals and the one or more receive signals;

identify a plurality of critical elements of a parameter vector based on a predefined criteria, wherein the parameter vector represents a relationship between the one or more transmit signals and the one or more receive signals;

calculate a solution to a linear system to generate a reduced parameter update vector having a plurality of elements, wherein the linear system is based on the plurality of critical elements, the covariance matrix, and the correlation vector;

update the parameter vector using the reduced parameter update vector to generate an updated parameter vector, wherein the reduced parameter update vector has fewer elements than the parameter vector; and process at least one of the one or more transmit signals using the updated parameter vector.

12. The transceiver device of claim 11, wherein each of the plurality of critical elements of the parameter vector corresponds to a respective element of the reduced parameter update vector, and wherein the processor is configured to update the parameter vector by:

updating only the plurality of critical elements of the parameter vector using the reduced parameter update vector to generate the updated parameter vector.

13. The transceiver device of claim 12, wherein the processor is configured to identify the plurality of critical elements of the parameter vector based on the predefined criteria by:

generating a parameter remainder vector based on the parameter vector, the covariance matrix, and the correlation vector;

identifying a predefined quantity of elements of the parameter remainder vector having the highest magnitudes according to the predefined ranking criteria; and selecting the elements of the parameter vector that correspond to the predefined quantity of elements of the parameter remainder vector as the plurality of critical elements of the parameter vector.

14. The transceiver device of claim 11, wherein the updated parameter vector estimates signal leakage between the transmit chain and the receive chain, and wherein the processor is configured to process at least one of the one or more transmit signals using the updated parameter vector by:

applying the updated parameter vector to an input signal vector comprising the one or more transmit signals to generate an estimated leakage signal; and applying the estimated leakage signal to at least one of the one or more receive signals in order to mitigate signal leakage from the at least one of the one or more receive signals.

15. The transceiver device of claim 11, wherein the processor is configured to calculate the solution to the linear system to generate the reduced parameter updated vector by:
applying conjugate gradient estimation to the linear system to obtain the reduced parameter update vector as a solution to the linear system.

16. A transceiver device comprising:
a transmit chain configured to transmit one or more transmit signals;
a receive chain configured to receive one or more receive signals; and
a processor configured to:
calculate a covariance matrix and a correlation vector based on the one or more transmit signals and the one or more receive signals;
identify a plurality of critical elements of a parameter vector based on a predefined criteria, wherein the parameter vector describes a relationship between the one or more transmit signals and the one or more receive signals;
calculate a solution to a linear system using conjugate gradient estimation to generate a reduced parameter update vector having a plurality of elements, wherein the linear system is based on the plurality of critical elements, the covariance matrix, and the correlation vector;
update the parameter vector using the reduced parameter update vector to generate an updated parameter vector, wherein the reduced parameter update vector has fewer elements than the parameter vector; and
generate an estimated leakage signal by applying the updated parameter vector to the one or more transmit signals; and
utilize the estimated leakage signal to cancel a leakage signal from at least one of the receive signals.

17. The transceiver device of claim 16, wherein the processor is configured to update the parameter vector using the reduced parameter update vector to generate an updated parameter vector by:
updating only the plurality of critical elements of the parameter vector.

18. The transceiver device of claim 16, wherein the processor is configured to generate the estimated leakage signal by:
calculating a mapped input signal vector using a new transmit signal of the one or more transmit signals, wherein the parameter vector describes a substantially linear relationship between the mapped input signal vector and signal leakage from the transmit chain to the receive chain; and
applying the updated parameter vector to the mapped input signal vector to generate the estimated leakage signal.

19. The transceiver device of claim 16, wherein the processor is configured to identify the plurality of critical elements of the parameter vector by:
generating a parameter remainder vector based on the parameter vector, the covariance matrix, and the correlation vector;
applying the predefined criteria to the parameter remainder vector to identify a plurality of highest-ranked elements of the parameter remainder vector; and
selecting the plurality of critical elements of the parameter vector as the elements of the parameter vector that correspond to the plurality of highest-ranked elements of the parameter remainder vector.

20. The transceiver device of claim 19, wherein the predefined criteria is based on magnitude,
and wherein the processor is configured to apply the predefined criteria to the parameter remainder vector to identify the plurality of highest-ranked elements of the parameter remainder vector by:
selecting a predefined quantity of elements of the parameter remainder vector that have the highest magnitudes as the plurality of highest-ranked elements of the parameter remainder vector.

* * * * *